United States Patent
Mixon

(10) Patent No.: US 6,499,814 B1
(45) Date of Patent: Dec. 31, 2002

(54) BRAKE CONTROL SYSTEM, SELF CONTAINED ELECTRONIC BRAKE CONTROL DEVICE THEREFOR AND METHODS OF MAKING AND USING THE SAME

(76) Inventor: Claude W. Mixon, 674 Twin Lakes Dr., Billings, MO (US) 65610

(*) Notice: Subject to any disclaimer, the term of this patent is extended or adjusted under 35 U.S.C. 154(b) by 0 days.

(21) Appl. No.: 10/078,309

(22) Filed: Feb. 18, 2002

Related U.S. Application Data

(63) Continuation of application No. 09/675,395, filed on Sep. 29, 2000, now Pat. No. 6,364,432.
(60) Provisional application No. 60/168,688, filed on Dec. 3, 1999, provisional application No. 60/183,503, filed on Feb. 17, 2000, and provisional application No. 60/230,767, filed on Sep. 7, 2000.

(51) Int. Cl.[7] ................................................. B60T 7/20
(52) U.S. Cl. .............................. 303/124; 303/7; 303/20
(58) Field of Search ............................ 303/20, 124, 7; 188/3 R, 3 H

(56) References Cited

U.S. PATENT DOCUMENTS

| | | | | |
|---|---|---|---|---|
| 2,856,036 A | * | 10/1958 | Mullen | 188/112 R |
| 2,870,876 A | * | 1/1959 | Pease | 188/139 |
| 3,053,348 A | * | 9/1962 | Stair | 188/112 R |
| 3,486,799 A | * | 12/1969 | Greentree | 188/3 R |
| 3,738,710 A | | 6/1973 | Pokrinchak et al. | 303/20 |
| 3,810,521 A | * | 5/1974 | Sparr | 188/112 A |
| 3,861,489 A | * | 1/1975 | Lang et al. | 188/112 A |
| 3,897,979 A | * | 8/1975 | Vangalis et al. | 188/112 R |
| 3,907,071 A | | 9/1975 | Wells | 188/3 R |
| 3,908,782 A | | 9/1975 | Lang et al. | 180/103 |
| 3,909,075 A | | 9/1975 | Pittet, Jr. et al. | 303/24 C |
| 3,951,464 A | * | 4/1976 | Donahue et al. | 137/513.3 |
| 3,955,652 A | * | 5/1976 | Nilsson et al. | 188/112 A |
| 4,052,695 A | | 10/1977 | Myers | 340/52 D |
| 4,066,996 A | | 1/1978 | Davis | 340/52 R |
| 4,072,362 A | * | 2/1978 | Van Anrooy | 303/15 |
| 4,196,936 A | | 4/1980 | Snyder | 303/20 |
| 4,222,614 A | * | 9/1980 | Spechko | 280/446.1 |
| 4,721,344 A | | 1/1988 | Frait et al. | 303/20 |
| 4,726,627 A | | 2/1988 | Frait et al. | 303/24 R |
| 4,762,627 A | * | 8/1988 | Martinez et al. | 252/390 |
| 4,984,852 A | * | 1/1991 | McNinch, Jr. | 188/112 R |
| 5,005,130 A | * | 4/1991 | Breen et al. | 188/112 A |
| 5,954,164 A | * | 9/1999 | Latham | 188/112 R |
| 6,012,780 A | * | 1/2000 | Duvernay | 188/112 R |
| 6,068,352 A | * | 5/2000 | Kulkarni et al. | 303/124 |
| 6,126,246 A | * | 10/2000 | Decker et al. | 188/112 R |
| 6,367,588 B1 | * | 4/2002 | Robertson et al. | 188/1.11 E |
| 6,349,558 B1 | * | 5/2002 | Cords | 303/15 |
| 6,394,558 B2 | * | 5/2002 | Cords | 303/15 |

* cited by examiner

*Primary Examiner*—Douglas C. Butler
*Assistant Examiner*—Benjamin A Pezzlo
(74) *Attorney, Agent, or Firm*—Richard L. Marsh

(57) ABSTRACT

An automated electronic brake control device comprises an upright enclosure having a separable cover, the enclosure containing an energy source, a breakaway safety switch, a controller comprising a grade and motion detection device, timer, relay and circuit breaker and means for connecting the electronic brake control device to the electrical circuitry of a towing vehicle and a towed vehicle. Preferably, the brake control device is mounted upon the towed vehicle and the controller has capabilities of sensing a change of velocity in at least one direction. Electric circuitry connects the braking circuitry of the towing vehicle to the braking system of the towed vehicle such that when towing vehicle brakes are applied, the brake control device supplies power to the braking system of the towed vehicle proportional to the sensed change in velocity.

14 Claims, 5 Drawing Sheets

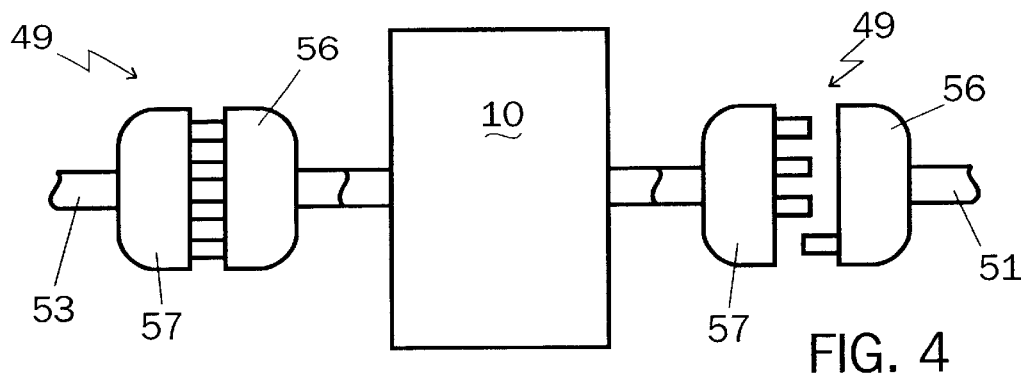
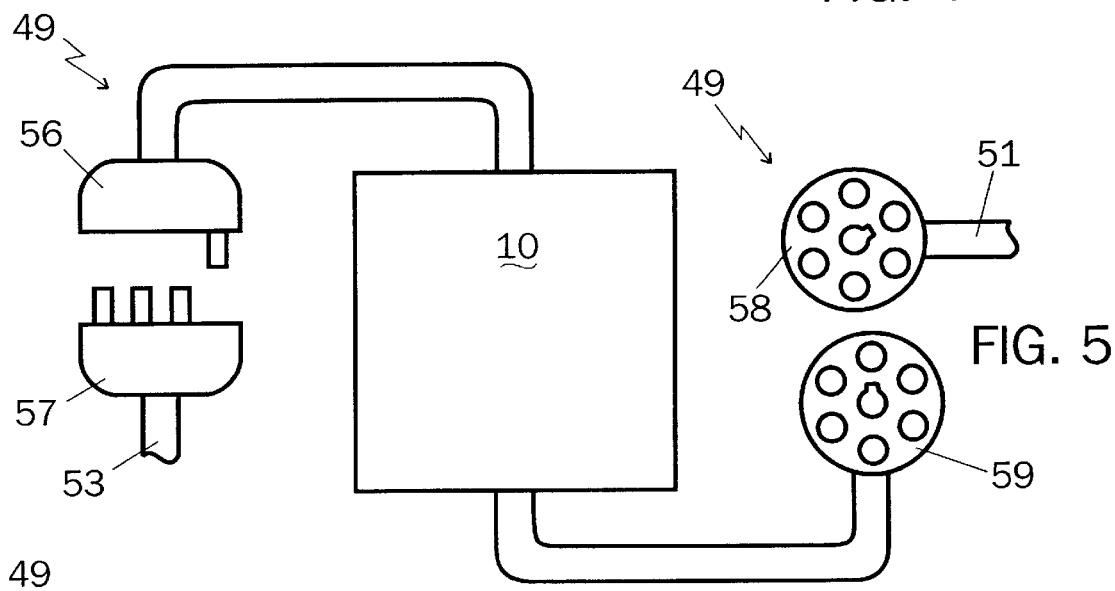
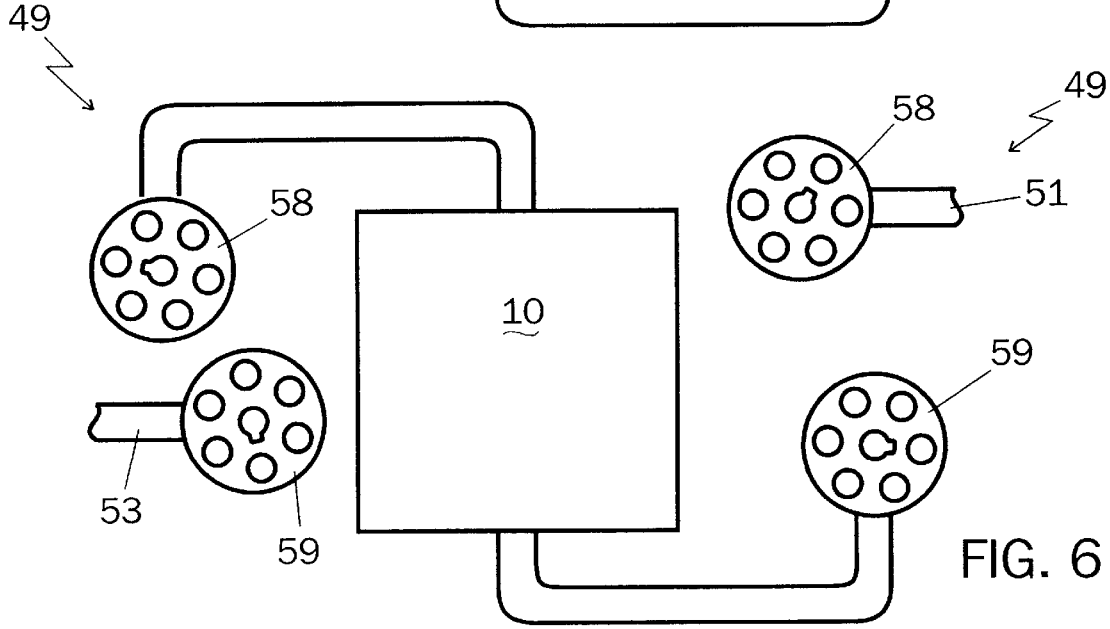

BRAKE CONTROL SYSTEM, SELF CONTAINED ELECTRONIC BRAKE CONTROL DEVICE THEREFOR AND METHODS OF MAKING AND USING THE SAME

CROSS REFERENCE TO RELATED APPLICATION

This application is a continuation of Applicant's parent patent application Ser. No. 09/675,395 filed on Sep. 29, 2000, now U.S. Pat. No. 6,364,432.

This application is a non-provisional application under 35 U.S.C. 111 (a) of its provisional application Ser. No. 60/168,688, filed Dec. 3, 1999, provisional application Ser. No. 60/183,503, filed Feb. 17, 2000, and provisional application Ser. No. 60/230,767, filed Sep. 7, 2000.

BACKGROUND OF THE INVENTION

1. Field of the Invention

This invention relates to a self contained electronic braking system for mounting on a towed vehicle and then being attached to the braking circuitry of the towing vehicle to provide for automatic energizing of the braking system of the towed vehicle when the brakes of the towing vehicle are applied.

2. Prior Art Statement

Current brake control for vehicles being towed comprises a hand operated or electronic brake controller mounted in the towing vehicle near the driver. Braking of the towed vehicle requires that the driver attend to the brake lever or controller with one hand while attempting to steer with the other hand and thus safety hazards include potential loss of control of both vehicles. Most current trailer braking systems also do not provide for braking control on the towed vehicle when the towed vehicle becomes separated from the towing vehicle or when the towed vehicle is parked separate from the towing vehicle.

Pokrinchak, et al., in U.S. Pat. No. 3,738,710 issued on Jun. 12, 1973 provides an elementary timing circuit in a towed braking system to differentiate between a momentary closure and a steady closure of a towed vehicle braking switch and thus electric trailer braking is dependent upon the duration of the closure of the stoplight switch of the towing vehicle.

It is known to provide for a truck-trailer hydraulic brake system comprising a trailer brake system including an electric motor actuated by an electrical circuit through a control means associated with the brake pedal onboard the tractor or a safety switch connected between the tractor and the trailer. No means for sensing motion is provided. For instance, see the U.S. Pat. No. 3,951,464 to Donahue, et al., issued on Apr. 20, 1976.

It is known to provide breakaway protection for electrically controlled trailer brakes by placing an additional battery on the trailer connected in parallel with the battery on the towing vehicle through a breakaway switch in which primary braking control is rheostatically controlled by the driver. For instance, see the U.S. Pat. Nos. 4,052,695 and 4,066,966 issued on Oct. 4, 1977 to Philip E. Myers and on Jan. 3, 1978 to Donald L. Davis, respectively.

It is known to provide an electrical surge braking system for a trailer wherein the electrical brakes of the trailer are energized when the trailer surges forwardly relative to the towing vehicle as the effective resistance of a resistor associated with one hitch member decreases as a wiper associated with another hitch member moves along the resistor. For instance, see the U.S. Pat. No. 4,222,614 issued on Sep. 16, 1980 to John A. Spechko. Similar devices are provided for hydraulic trailer braking systems.

Also, it is known to provide a braking system for a towed vehicle manually actuated by the driver of the towing vehicle and wherein the towed vehicle has an onboard battery to provide for braking of the towed vehicle in case of separation from the towing vehicle wherein braking is actuated by a separable connector between the towed vehicle and the towing vehicle when the vehicles become separated. For instance, see the U.S. Pat. No. 3,907,071 issued on Sep. 23, 1975 to Wm. H. S. Wells.

It is also known to provide a towing vehicle mounted brake controller wherein braking of a towed vehicle is manually actuated by the driver, initiated by a signal from the towing vehicle brake system and wherein the amount of towed vehicle braking is controlled by a pendulum type grade and motion detection device on the towing vehicle. For instance, see the U.S. Pat. No. 3,909,075 issued on Sep. 30, 1975 to Pittet, Jr, et al.

Robert C. Snyder in U.S. Pat. No. 4,196,936 issued on Apr. 8, 1980 provides for electric or hydraulic trailer braking from a series of components comprising a brake controller mounted in the tractor through a separate wiring harness wherein power is supplied to a variable frequency oscillator when the brake pedal is depressed. The series of components uses a hall effect sensor for sensing of the deceleration or lateral movement of the towing vehicle and for applying the brakes dependent upon the magnitude of the motion.

Frait, et al., in U.S. Pat. No. 4,721,344 issued on Jan. 26, 1988 and U.S. Pat. No. 4,726,627 issued on Feb. 23, 1988, respectively, provide for electric trailer braking from a brake controller mounted near the driver of a towing vehicle through a separate wiring harness wherein power is supplied to the pulse width modulator of the controller only when the brake pedal is depressed or when a manually controlled lever is moved to the on position. The controller uses a pendulum for sensing of the deceleration of the towing vehicle and generates a signal representing the magnitude of the deceleration.

Additionally, it is known to provide a stability control system for a vehicle to prevent swerving and swaying comprising means for sensing lateral acceleration forces acting upon the vehicle and energizing a brake in response to signals wherein the means for sensing lateral acceleration is a pair of inclined mercury switch assemblies, hall effect or pendulum sensors. For instance, see the U.S. Pat. No. 3,861,489 issued on Jan. 21, 1975 or the U.S. Pat. No. 3,908,782 issued on Sep. 30, 1975 both to Lang, et al.

Finally, it is further known to provide a method of controlling brakes on a trailer by sensing the rate of deceleration and inclination of the towing vehicle, generating variable deceleration and variable inclination signals, sending a brake amperage output signal to the brakes of the trailer and continuously proportioning the brake amperage output in accordance with both the deceleration and inclination signals. For instance, see the U.S. Pat. No. 6,012,780 issued on Jan. 11, 2000, to Mark E. Duvernay.

The above cited braking systems, though usable in their respective environments, do not have means of transferring all control of an electronic braking system from the towing vehicle to the towed vehicle. The prior art trailer braking systems do not describe a self contained electronic braking control device mounted upon the trailer wherein the braking control device comprising a means for sensing deceleration of the trailer and means for actuating the braking system of the trailer either independent of a signal from the towing vehicle or using the braking light circuit of the towing vehicle for actuation of the brakes on the towed vehicle. Therefore, there is a great need for an electric or hydraulic trailer braking system for use with a trailer having at least one pair of wheels fitted with electrically or hydraulically actuated brakes wherein the trailer braking system is a self contained electronic braking control device mounted upon the trailer, the braking control device comprising a means for sensing deceleration of the trailer and means for actuating the brakes of the braking system of the trailer, the self contained electronic braking control device having electric circuitry connecting the braking circuitry of the towing vehicle to the braking system of the towed vehicle wherein the brakes of the braking system of the towed vehicle are automatically energized to an initial engagement state upon sensing a braking signal from the towing vehicle.

SUMMARY OF THE INVENTION

Heavy towed vehicles, particularly two and three axle vehicle trailers are required to have electric brakes operable from the towing vehicle. Such brakes usually require some hand operation by the driver of the towing vehicle presenting hazards to the driver and the other vehicles on the road. Other towed vehicles are equipped with a hydraulic braking system operated by a surge connection at the towed/towing vehicle hitch location or with an electric solenoid operating a hydraulic cylinder with an electric, pneumatic or hydraulic signal from a towing vehicle.

Therefore, it is an object of this invention to provide an electronic trailer braking system for a trailer having at least one pair of wheels fitted with electrically actuated brakes wherein the trailer braking system is a self contained electronic braking control device mounted upon the trailer, the braking control device comprising a means for sensing deceleration of the trailer and means for actuating the electrically actuated brakes of the trailer independent of a signal from the towing vehicle.

It is still another object of this invention to provide an automated electronic braking system comprising an energy source, a charging circuit, a grade and motion sensing device, a timer, a relay, a circuit breaker, a breakaway safety switch, a seven wire male plug for connecting to a cooperating female connector on a towing vehicle and a female socket plug for connecting to a seven wire male plug of a towed vehicle.

It is yet another object of this invention to provide an automated electronic braking system which may be mounted either within the towing vehicle wherein a complete brake wiring harness from a location near the driver to the braking system on the towed vehicle is installed and used to connect and actuate the electric brakes of the towed vehicle or wherein the automated electronic braking system is mounted on the towed vehicle and uses the braking light circuit of the towing vehicle for actuation of the electric brakes of the towed vehicle. When mounted on the towed vehicle, electric circuitry connects the braking circuitry of the towing vehicle to the braking system of the towed vehicle such that when towing vehicle brakes are applied, the braking system of the towed vehicle is automatically energized and the electronic brake control device containing the grade and motion device senses incline, lateral motion and/or braking and hence supplies power to the braking system of the towed vehicle dependent upon the slope of the grade, the severity of the motion or both. When made a part of the towing vehicle, a breakaway switch is in parallel connection with the electrical connection between the towing vehicle and the towed vehicle and separated from the electronic brake control device by the wiring harness. Generally, the energy source for the onboard towed vehicle mounted braking system is integral therewith but may be a separate battery, an array of solar cells, the towing vehicle energy source, a direct current or an alternating current source, a capacitor or an energy source resident in the towed vehicle or in the load carried by the towed vehicle. Similarly, the energy source for the braking system having the controller mounted within the towing vehicle is generally carried by the towing vehicle but may be one of the alternate forms recited above. The automated electronic braking system may also employ an internal charger, an external charger or both when an internal energy source is used and may also employ a seven wire to four wire adaptor for use with towing vehicles having a four wire plug.

It is another object of this invention to provide a self contained electronic brake control device comprising an upright enclosure having a separable cover, the enclosure containing an energy source, a brake controller, at least one relay and means for connecting the electronic brake control device from a towing vehicle to a towed vehicle.

One object of this invention is to provide a retrofit for an existing towed vehicle with a self electronic brake control device mounted upon the towed vehicle wherein a 4 wire female connector for connecting the electronic brake control device to a 4 wire male plug from the towing vehicle and a 4 wire male plug for connecting the electronic brake control device to a 4 wire female connector of the towed vehicle these pigtails used to connect the control device to the electrical system of the towed and towing vehicle.

Still another object of this invention is to provide a retrofit for an existing towed vehicle with a self electronic brake control device wherein a 4 wire female connector for connecting the electronic brake control device to a 4 wire male plug from the towing vehicle and a 7 wire male plug for connecting the electronic brake control device to a 7 wire female connector of the towed vehicle these pigtails used to connect the control device to the electrical system of the towed and towing vehicle.

Yet another object of this invention is to provide a retrofit for an existing towed vehicle with a self electronic brake control device wherein the means for connecting comprises a 7 wire female connector for connecting the electronic brake control device to a 7 wire male plug from the towing vehicle and a 7 wire male plug for connecting the electronic brake control device to a 7 wire female connector of the towed vehicle these pigtails used to connect the control device to the electrical system of the towed and towing vehicle.

One important object of this invention is to provide a retrofit for an existing towed vehicle with a self electronic brake control device wherein a means for connecting comprises splice connectors and connecting wires for connecting the electronic brake control device directly to a wiring loom resident within the towed vehicle.

It is also an object of this invention to provide an electronic trailer braking system for a towed vehicle having at least one pair of wheels fitted with hydraulically actuated brakes wherein the towed vehicle braking system is a self contained electric/hydraulic braking control device mounted upon the towed vehicle, the braking control device comprising a means for sensing deceleration of the trailer and means for actuating the hydraulically actuated brakes of the trailer either from a signal from the towing vehicle braking circuit or independently of a signal from the towing vehicle.

One important object of this invention is to provide a retrofit for an existing towed vehicle with a self electronic brake control device wherein a means for connecting comprises splice connectors and connecting wires for connecting the electronic brake control device directly to a wiring loom resident within the towed vehicle, and at least one hydraulic line for connecting a hydraulic pump of the self contained control device to the hydraulic brakes of the towed vehicle.

A significant object of this invention is to provide a method of controlling the braking of a towed vehicle using a braking control device onboard the towed vehicle, the braking control device comprising an energy source, a means for sensing deceleration of the towed vehicle, a means for generating a braking signal and a means for energizing the brakes of the towed vehicle. The method comprises the steps of sensing deceleration of the towed vehicle, determining a rate of deceleration of the towed vehicle, sensing a braking signal from a towing vehicle towing the towed vehicle, generating a braking signal within the braking control device wherein the braking signal is proportional to the rate of deceleration, energizing the brakes of the towed vehicle to initial engagement from the energy source upon sensing the braking signal from the towing vehicle and applying energy from energy source to the brakes of the towed vehicle proportional to the braking signal.

Another significant object of this invention is to provide a method of controlling the swaying of a towed vehicle using a braking control device onboard the towed vehicle. The method comprises a means for generating a swaying signal, a means for generating a braking signal and a means for energizing the brakes of the towed vehicle. The steps of the method include sensing at least two successive lateral movements of the towed vehicle within a given time, generating a swaying signal upon sensing the lateral movements, determining a rate of lateral movement of the towed vehicle, generating a braking signal within the braking control device wherein the braking signal is proportional to the rate of lateral movement and energizing the brakes of the towed vehicle proportional to the signal.

The primary purpose of the automated electronic brake control system of this invention mounted on the towed vehicle is to remove towed vehicle braking control devices from of the towing vehicle and transfer all towed vehicle braking functions to the towed vehicle by energizing the braking system of the towed vehicle from the braking system of the towing vehicle. The alternate purpose of the automated electronic brake control system of this invention mounted in the towing vehicle is to eliminate the manual operations required by the driver by providing a brake controller having capabilities of sensing a change of velocity in at least one direction and an automated system to apply the brakes dependent upon the severity the change of velocity.

BRIEF DESCRIPTION OF THE DRAWINGS

FIG. 4 is a plan view of one embodiment of a means for connecting the self contained brake control device of FIG. 1 to a towing vehicle and a towed vehicle.

FIG. 5 is a plan view of another embodiment of a means for connecting the self contained brake control device of FIG. 1 to a towing vehicle and a towed vehicle.

FIG. 6 is a plan view of another embodiment of a means for connecting the self contained brake control device of FIG. 1 to a towing vehicle and a towed vehicle.

DESCRIPTION OF THE PREFERRED EMBODIMENTS

While the various features of this invention are hereinafter described and illustrated as an automated electronic trailer brake control system which comprises an upright enclosure having a separable cover, the enclosure containing an energy source, a grade and motion detection device, a timer, a relay, a circuit breaker, a breakaway safety switch, a seven wire male plug for connecting to a cooperating female connector on a towing vehicle and a female socket plug for connecting to a seven wire male plug of a towed vehicle with electric circuitry connecting the braking circuitry of the towing vehicle to the braking system of the towed vehicle such that when brakes are applied, the braking system of the towed vehicle is automatically energized and the grade and motion detection device supplies power to the breaking system of the towed vehicle dependent upon the slope of the grade, the severity of the motion or both, it is to be understood that the various features of this invention can be used singly or in various combinations thereof as an automated electronic trailer brake control system for either the towing or towed vehicle as can hereinafter be appreciated from a reading of the following description.

Figure 1:
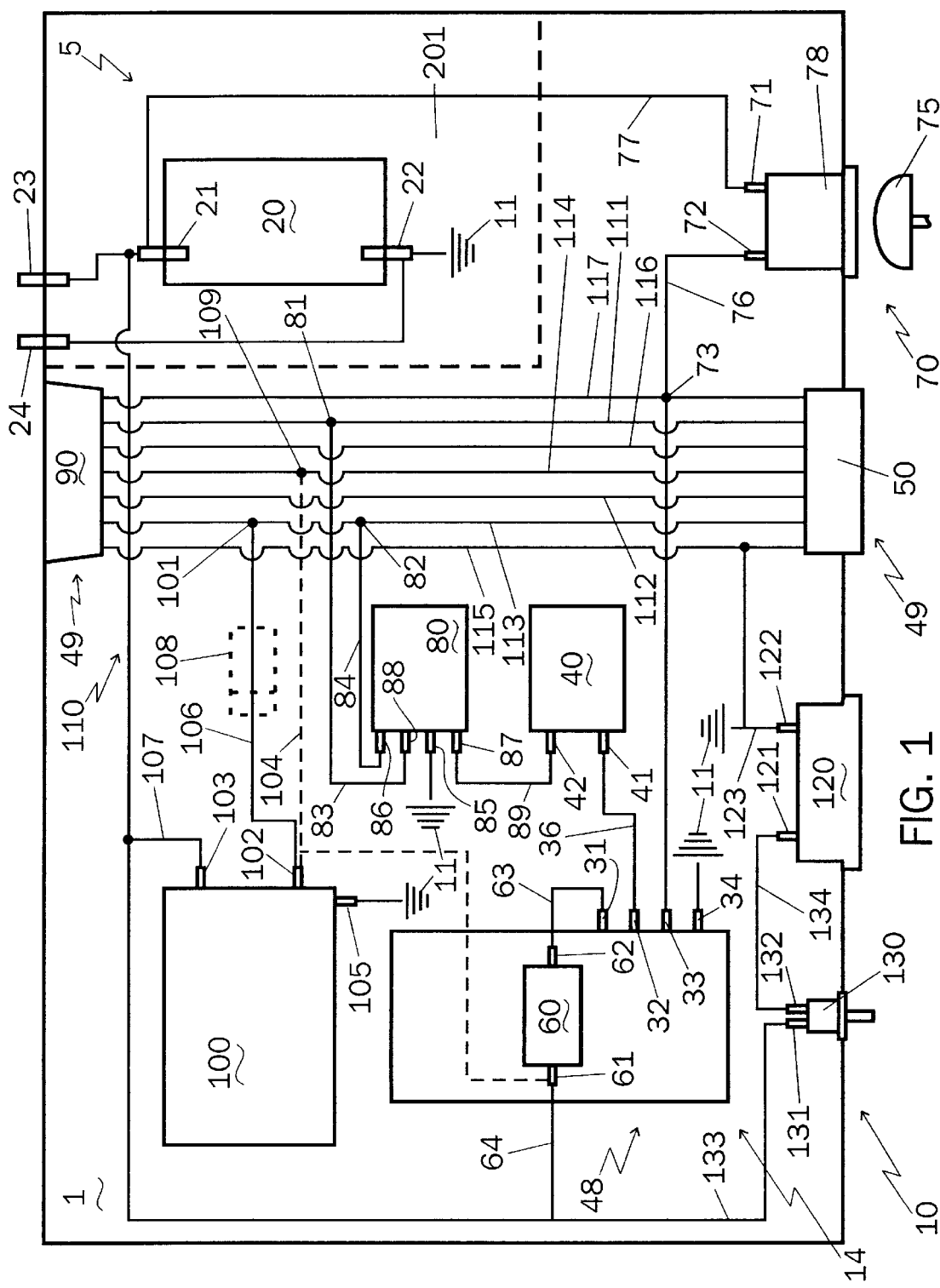
FIG. 1 is a diagram of the components of one embodiment of the self contained electronic brake control device of this invention in an enclosure showing the electric circuitry connecting the components.
Figure 2:
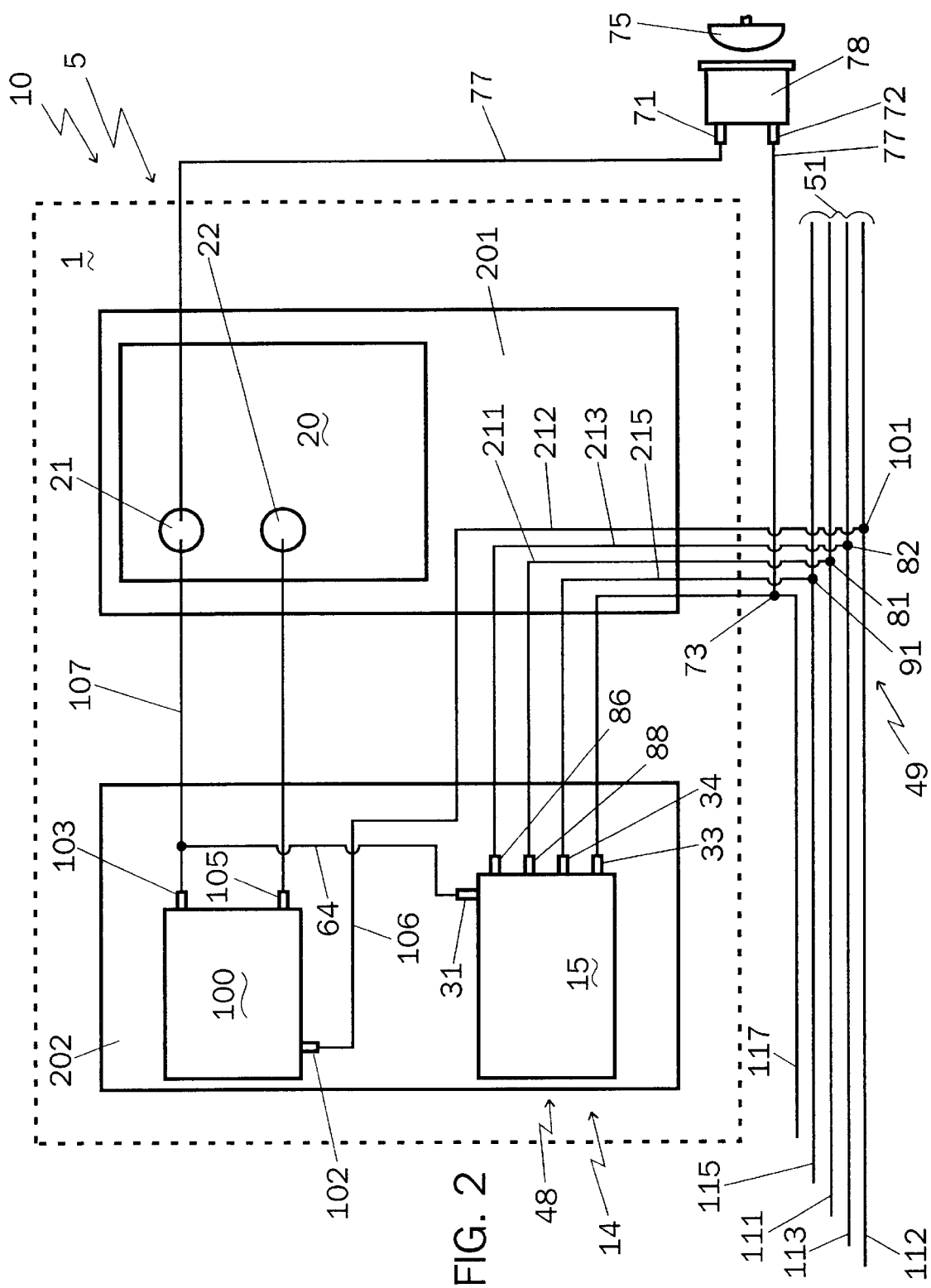
FIG. 2 is an electrical diagram of the preferred embodiment of the self contained electronic brake control device of this invention shown connected to an existing wiring loom of a towed vehicle.
Figure 3:
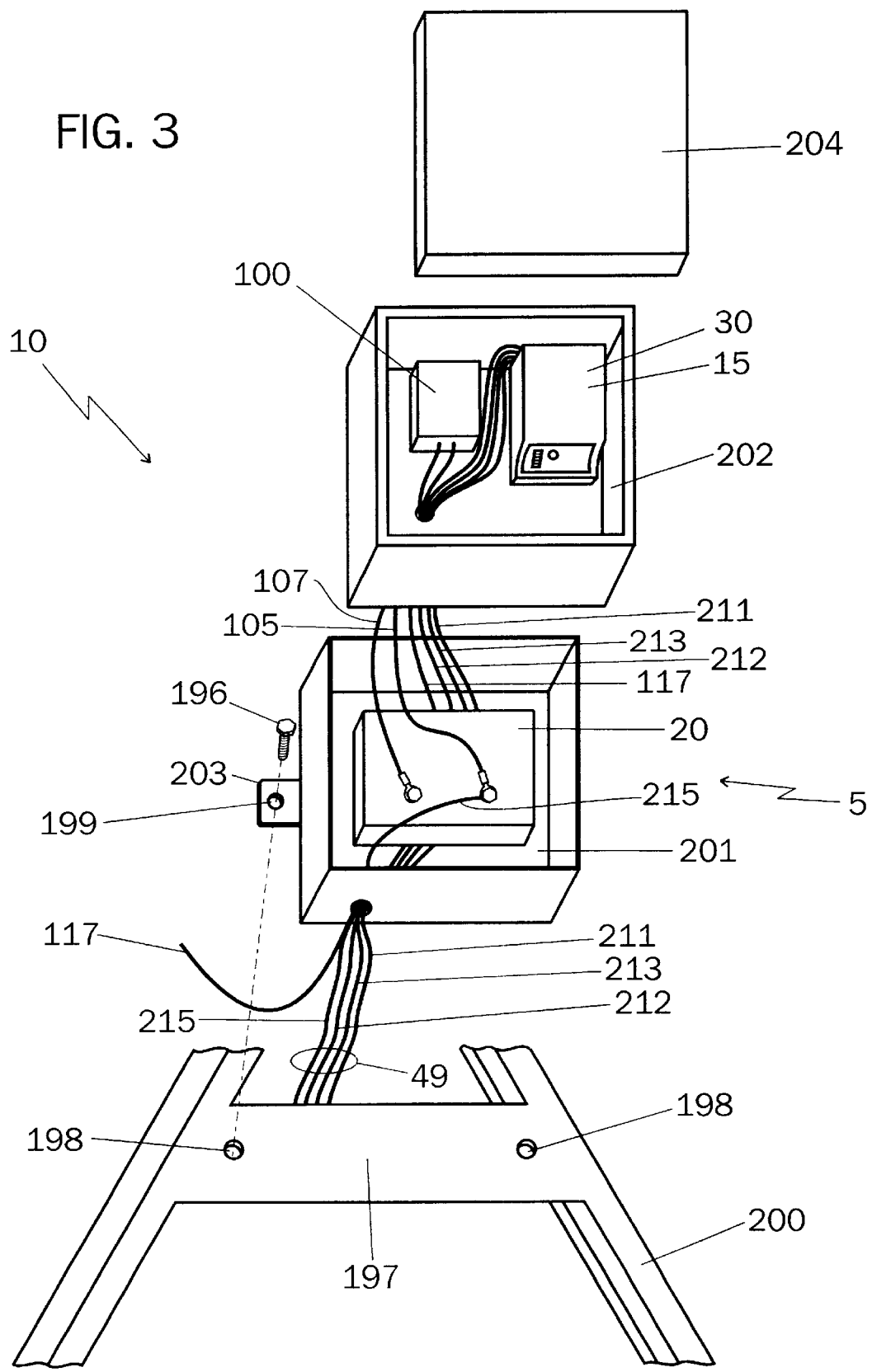
FIG. 3 is an exploded view of the preferred embodiment of the self contained electronic brake control device of this invention shown above a mounting location on a towed vehicle.

Referring now to FIGS. 1, 2 and 3, the automated electronic brake control system of this invention is generally referred to with the numeral 10, electronic brake control system shown in an enclosure 1 wherein enclosure 1 is preferably mounted onboard a towed vehicle tongue 200. Electronic brake control system 10 preferably includes an energy source 5 such as onboard battery 20, a grade and motion detection device 30, a battery charger 100 and may also include a separate timer 40, a separate relay 80, a separate circuit breaker 60, a breakaway safety switch 70, a seven wire male plug 50 for connecting to a cooperating female connector on towing vehicle and a female socket plug 90 for connecting to a seven wire male plug of a towed vehicle. Grade and motion detection device 30 preferably comprises a braking controller 15 commonly used in the industry wherein controller 15 may use a G-force indicator to sense positive or negative changes in motion or at least one pendulum, hall effect or the like sensor for sensing incline, lateral movement and/or braking G-force wherein grade and motion detection device 30 outputs either a digital or electrical signal proportional to change in motion in the sensed direction. The output signal of grade and motion detection device 30 is a braking signal output through terminal 33 supplying braking force to the brakes of the towed vehicle braking system. As grade and motion detection device 30 outputs a signal proportional to the amount of acceleration in the sensed direction, the braking force output through terminal 33 is also generally proportional. The braking signal may be generated based on X axis acceleration, that is, the change in forward or backward motion of the towing/towed vehicle package or on Y axis acceleration transverse to the direction of motion of the towing/towed vehicle package. It is understood here, that acceleration refers to a change in velocity in any of the four directions, ±X, ±Y, sensed by grade and motion detection device 30. In addition, grade and motion detection device 30 may modulate the output signal based upon the change in grade, that is, a change in the ±Z direction thus effectively modulating the change in velocity in at least one of the ±X, ±Y directions.

Grade and motion detection device 30, in this preferred embodiment herein described, contains a G-force indicator to sense a change in velocity and/or grade as set forth above. The preferred G-force indicator is model ADXL202, a dual axis accelerometer provided by Analog Devices, One Technology Way, Norwood, Mass. wherein the G-force indicator comes packaged as a 14 pin surface mount integrated circuit (IC). The digital signal output for the separate signals may be measured directly with a microprocessor counter wherein each output signal is a ratio of the pulsewidth to the period. The period is adjustable from 0.5 ms to 10 ms by a variable resistor while the pulsewidth is altered within separate X and Y sensors. The G-force indicator is able to measure acceleration in any direction as the null output signal is set at 50% of the duty cycle. Therefore, a signal is generated when the pulsewidth is not equal to the period. Since the G-force indicator can sense movement force up to 2 times the force of gravity in either direction along both the X and Y axes and the number of counts within the IC increases linearly therewith, the output signal is linear from the null point to a maximum. The digital output signal can then be converted to an analog electrical signal to increase braking force. Typically, in an electrically actuated braking system, braking voltage increases from an electrical signal equal to approximately 20% of energy source 5 to a maximum of the output of energy source 5 linearly as the output from the G-force indicator increases linearly. Braking voltage begins at an electrical signal equal to 20% of energy source 5 as this low voltage sets the electric brake coil in close proximity to the braking surface of electric braking systems upon energizing the braking circuit, that is, generally upon depressing the brake pedal of the towing vehicle. Any increase in braking voltage causes the braking pad of the electric brake coil to frictionally engage the braking surface of the drum with a force proportional to the voltage in the braking coil thus pulling a braking arm therealong pressing the braking shoes of the electrically actuated brakes against the inside surface of a drum. Though the braking voltage typically increases linearly from an electrical signal equal to 20% of energy source 5 upon initiation, at least one specific map of desired braking force may be stored within a memory chip in the circuitry of controller 15 thus causing braking force to rise more rapidly reaching the maximum braking force before the G-force indicator has reached its fill output. Conversely, the map of a desired braking signal could cause the braking force to rise more slowly. The internal workings of the electric brake pad, coil, shoes and drum are well known in the art and need not be repeated here.

Electronic brake control system 10 preferably has means to define to the microprocessor therewithin the type of braking system being connected thereto, the type of wiring system within each of the towed and the towing vehicle and, when necessary, the type of controller 15 used therewithin. For instance, DIP switches may be employed to differentiate between an electric/electric braking system and an electric/hydraulic braking system. These DIP switches may also be set to differentiate between a 4 wire flat connection to the towing vehicle and a 7 wire round connection to the towed vehicle or another combination of connections between the towed and towing vehicles. Where a controller having only capabilities of sensing a change in forward motion, DIP switches may be set to disable the sway correction portion of electronic brake control system 10. Likewise, the means to define may be used to redefine to the microprocessor components which have been added to electronic brake control system 10 installed after the initial installation thereof. For instance, if controller 15 having only capabilities of sensing a change in forward motion is replaced with controller 15 having multiple direction sensing capabilities, the DIP switches may be changed to reflect the new capabilities. Though DIP switches have been cited as one means to define to the microprocessor, pre-programmed chips may also be advantageously used. Furthermore, an 7, 9 or 15 pin, parallel, serial or USB input port in electronic brake control system 10 connected to the microprocessor may be utilized to reprogram the microprocessor using an external computer.

Preferably, electronic brake control system 10 has a self diagnostic routine within the microprocessor to sense faults in any of the circuits within electronic brake control system 10, the towing vehicle braking system or the towed vehicle braking system wherein the self diagnostic routine has an output signal to the operator of the vehicle. One means of alerting the operator is by a radio frequency signal to a hand held remote receiver/transmitter carried by the operator. The remote receiver/transmitter may be fitted with an LED which when a fault is detected in the self diagnostic routine, the LED is lighted alerting the operator. The remote receiver/transmitter may also be used to change operation of electronic brake control system 10 by sending a radio frequency signal from the hand held remote receiver/transmitter to the microprocessor within electronic brake control system 10 wherein the radio frequency signal may be used to initially set the brakes shoes in close proximity to the drum, disable or enable the swaying capabilities and/or apply braking force to the brakes of the towed vehicle braking system or other capabilities programmed into the microprocessor.

Controller 15 contained within grade and motion device 30 may generate a small output when tilted in at least one direction and therefore the signal output may be used to initially level grade and motion device 30 thus making installation easier for the user. Leveling may be accomplished using the DA (digital to analog) converted signal or voltage outputs from other pins on the IC as the X and Y sensors within the IC each have a voltage output in addition to the digital outputs. The actual duty cycle output, or alternately the voltage output, varies with orientation of the IC and thus orientation of the IC provides for a different braking force in one direction along the axis of the IC when controller 15 containing grade and motion device 30 experiences a grade. For instance, with the IC mounted vertically with pin 1 at the top, the duty cycle is 62.5% while when reversed vertically with pin 1 at the bottom the duty cycle drops to 37.5%. Thus, it may be advantageous to place the IC within controller 15 in grade and motion device 30 with pin 1 facing in the −X direction such that a negative change in grade in the +X direction, that is, a downslope, would result in a slightly greater braking force when grade and motion device 30 is tilted relative to the Earth's surface with the pin 1 end rising. By thus mounting the IC with the pin 1 end facing in the −X direction a greater braking force may be generated in the forward movement direction of a towing/ towed vehicle package, especially on a downslope, as the force required to brake a package going forward at cruising speed would be greater than the force required to brake the package while backing.

The IC may have a piezoelectric crystal in each of an X sensor and a Y sensor for sensing acceleration along the X and Y axes and as such may measure acceleration in either direction therealong, ie. ±X, ±Y. As the X and Y sensors act independently, acceleration in a direction between the axes may also be sensed as both X and Y sensors would detect a change in velocity along these orthogonal axes. The digital output is thus an algebraic sum of the outputs of both sensors, this algebraic sum used in grade and motion device 30 to provide for a braking force herein described. Of course, the signals from the X and Y sensors may be modified, amplified or modulated to provide for different outputs in the various directions to allow for a different algebraic sum other than the sum of squares. For instance, the output signal of the Y sensor may be made to output a signal independent of the braking light circuit of the towing vehicle to automatically arrest sway wherein the output signal of the Y sensor would greater or lesser than a signal from the X sensor for a given amount of motion. Though piezoelectric crystals are preferred for X and Y sensors as these piezoelectric crystals effectively have no moving parts, other motion detection devices may be used within the G-force indicator as will hereinafter be fully described. It is readily apparent here, that with the grade and motion device 30 of the preferred embodiment of the invention having the G-force indicator therein, that a braking force will be generated upon backing a towed vehicle. Thus, the grade and motion device 30 and the braking system 10 of this invention using the brake controller 15 are not limited to forward movement as is prevalent with conventional brake controllers.

Furthermore, as controller 15 containing the G-force indicator can sense a change in velocity laterally to the direction of movement of the towed/towing vehicle package, swaying of a towed vehicle can readily be corrected. Though the change in velocity laterally would generally be less than that required in bring the package to rest, the proportional output of the sensor in the lateral direction, herein the Y sensor, would apply braking force to the electric brakes of a towed vehicle at a low level thereby correcting any swaying of the package. Thus, no action by the operator of the vehicle is required to arrest swaying of a towed vehicle providing this improved measure of safety.

Referring now specifically to FIG. 2, an electronic trailer braking system of a trailer having at least one pair of wheels fitted with electrically actuated brakes is fitted with a self contained electronic braking control device 10 comprising grade and motion device 30 containing controller 15, an energy source 5 and charging device 100. Electronic braking control device 10 is preferably mounted at a location selected by the owner or manufacturer upon or within the towed vehicle or trailer, the braking control device comprising a means for sensing deceleration of the trailer and means for actuating the electrically actuated brakes of the trailer independent of a signal from a vehicle towing the trailer. Preferably, as electronic braking control device 10 is mounted onboard the towed vehicle with energy source 5 mounted within electronic braking control device 10, in case of separation of the towed vehicle from the towing vehicle breakaway switch 70 becomes separated and braking control device 10 senses deceleration in at least one direction. Thus, braking force is applied directly to the electric brakes of the towed vehicle through connecting wire 77 through now closed switch 70, through connecting wire 77 to brake wire connection 73 on brake wire 117. In this manner, braking force is applied at full effect as energy source 5 is directly connected to the electric brakes of the towed vehicle and thus the magnetic coil receives the full 12 VDC energy of battery 20 wherein the magnetic coil becomes firmly attracted to the metallic pad dragging the brake arm therealong effectively locking the electric brakes of the towed vehicle.

In the embodiment shown in FIG. 2, controller 15 contains a G-force indicator within an integrated circuit and also contains relay 80 and timer 40, wherein these components are mounted on a circuit board within controller 15. Thus, controller 15 may be used as a full function brake controller operating in conjunction with the braking system of the towed vehicle to provide for towed vehicle braking as well known in the art. However, as controller 15 of this invention contains a G-force indicator for sensing acceleration in at least one orthogonal axis and proportionally applies braking force based on sensing a change in velocity without intervention by the operator of the towing vehicle, greater safety with towed/towing vehicle packages is provided. Of course, the pendulum or hall effect operated brake controllers known in the art may be modified to use only the grade and/or motion sensing elements therein wherein at least one of these brake controllers is installed in enclosure 1 as controller 15.

Referring to FIGS. 1–7, self contained electronic brake control device 10 comprises an upright enclosure 1 having a separable cover 204, a first compartment 202 and a second compartment 201, second compartment 201 containing an energy source 5, preferably a high capacity dry cell battery 20. First compartment 202 contains brake controller 15 and means 49 for connecting electronic brake control device 10 to the braking system of a towing vehicle and the towed vehicle.

Though plugs 50, 90 in FIG. 1 are shown as 7 wire male & female plugs respectively each mounted in a wall of enclosure 1, these plugs 50, 90 could comprise 4 wire male & female connecting plugs respectively on pigtails extending from enclosure 1, wherein for instance, referring now to FIG. 4, means 49 for connecting may comprise a 4 wire female connector 56 for connecting electronic brake control device 10 to a 4 wire male plug 57 from the wiring harness 53 of the towing vehicle and a 4 wire male plug 57 for connecting electronic brake control device to a 4 wire female connector 56 to the wiring loom 51 of the towed vehicle. Likewise, referring now to FIG. 5, means 49 for connecting may comprise a 4 wire female connector 56 for connecting electronic brake control device 10 to a 4 wire male plug 57 from the wiring harness 53 of the towing vehicle and a 7 wire male plug 59 for connecting electronic brake control device to a 7 wire female connector 58 to the wiring loom 51 of the towed vehicle. In yet another embodiment as shown in FIG. 6, means 49 for connecting may comprise a 7 wire female connector 58 for connecting electronic brake control device 10 to a 7 wire male plug 59 from the wiring harness 53 of the towing vehicle and a 7 wire male plug 59 for connecting electronic brake control device to a 7 wire female connector 58 to the wiring loom 51 of the towed vehicle. Preferably, however, referring now to FIG. 2, means 49 for connecting comprises splice connectors 81, 82, 101, 91, connecting wires 211, 213, 212 and 215 respectively and brake wire 117 for connecting electronic brake control device 10 from controller 15 directly to wiring loom 51 resident within the towed vehicle.

Referring now to FIG. 1, electronic brake control device 10 may comprise such a modified controller 15 along with energy source 5, charging unit 100, timer 40, relay 80, circuit breaker 60, breakaway safety switch 70, means 49 for connecting electronic brake control device 10 to the electrical circuity of a towing vehicle and a towed vehicle. In this embodiment, means 49 for connecting comprises a 7 wire male plug 50 for connecting to a cooperating female connector on the towing vehicle and female socket plug 90 for connecting to a mating 7 wire male plug of the towed vehicle. It is fully understood here, that though the description of male and female plugs 50, 90 respectively, shown schematically in FIG. 1 is used herein in a particular location with reference to electronic brake control device 10, that these plugs 50, 90 may be reversed to accommodate various towed vehicle manufacturers' specifications. Furthermore, when it is desired to retrofit an existing towed vehicle with electronic brake control device 10 of this invention without replacing the existing 4 wire wiring plugs on either the towed or towing vehicle, plug 50 may receive a 7 wire female connector 58 of a 7 wire to 4 wire pigtail having 7 wire female connector 58 on one end and a 4 wire female connector 56 on the opposed end thereof wherein 4 wire female connector 56 is adapted to be affixed to the towing vehicle having a 4 wire male plug 57 connected to the towing vehicle wiring harness 53. Such a pigtail would appear similar to FIG. 5 as if control device 10 as shown in this figure were omitted.

In self contained electronic brake control device 10 of FIG. 1, breakaway safety switch 70 comprises a first connector 75 affixed to the towing vehicle and a second connector 78 affixed to the towed vehicle, where second connector 78 may be installed in a wall of brake control device 10, the braking system of the towed vehicle actuated upon separation of first connector 75 of breakaway safety switch 70 from second connector 78. Breakaway safety switch 70 used in this invention is preferably a normally open switch when first connector 75 is installed into second connector 78 and wherein when first connector 75 is removed from second connector 78, breakaway safety switch 70 closes applying full power of energy source 5 to the towed vehicle brakes as the brakes become directly connected to energy source 5 upon separation of the parts 75, 78 of breakaway safety switch 70.

Breakaway safety switch 70 of electronic brake control device 10 of the instant invention also constitutes a parking brake when the towed vehicle is at rest and the first connector 75 is separated from second connector 78. As electronic brake control device 10 is normally provided with its own power source 5 and may have an alternate solar panel (not shown) to maintain the charge, removal of first connector 75 of breakaway connector 70 from second connector 78 of the towed vehicle automatically energizes the braking circuit of the electronic brake control device 10 thereby applying brakes to the towed vehicle when parked.

Breakaway safety switch 70 of self contained electronic brake control device 10 may alternately constitute an emergency brake when first connector 78 is separated from second connector 75 when for instance, the towed vehicle is moved with an open vehicle such as a tractor, by permitting the operator of the open vehicle to use first connector 78 as an actuating device for emergency stopping of the towed vehicle as again, the brakes of the towed vehicle become directly connected to the onboard energy source 5 of device 10.

System 10 may additionally employ a charger 100 for maintaining charge on battery 20, a battery condition meter 120 and a switch 130 for energizing battery condition meter 120. Charger 100 may be a trickle charger mounted onboard control system 10 and receive power from the towing vehicle by being connected to the green wire 112 as shown in FIGS. 1 and 2 at connection point 101. In the conventional 4 wire wiring system for towed vehicles, green wire 112 carries current for the running lights, the brown wire 111 receives right hand turn signals or a brake signal, the red wire 113 receives left hand turn signals or a brake signal and the white wire 115 is system ground. In a 7 wire wiring system for towed vehicles, these 4 wires are again conventional and a black wire 114 provides auxiliary power wire, a yellow wire 116 is auxiliary ground while the blue wire 117 is the trailer brake connection. Normally, a four wire flat connector, hereinafter, four-flat connecter, is utilized for connecting the towing vehicle to the towed vehicle, these four-flat connectors provided on most rental trailers, boat trailers, utility trailers and the like which are in use by the general public wherein the wiring loom 51 is typically constructed of 16 gauge wire and therefore have insufficient current carrying capacity for a electric trailer brakes. Therefore, the braking system 10 of this invention is made for use with either a seven wire system or a four wire system by the unique circuitry described in the instant specification and shown in FIGS. 1 and 2 by providing a signal from left and right turn signal wires to actuate the electric brakes on the towed vehicle through braking circuit blue wire 117 wherein blue wire 117 is at least 12 gauge wire having sufficient current carrying capacity. Referring now to FIG. 1, a second source of power for charger 100 is shown in dashed lines where connection wire 104 is connected to auxiliary power black wire 114 at connection 109 and to power in terminal 102 on charger 100. Where charger 100 receives power from these parallel sources, a diode 108 is inserted into connecting wire 106 to prevent back feeding of current into the running light circuit through running light green wire 112. Such a connection may be desirable for vehicle owners who have purchased the towing vehicle with a towing package factory installed thereupon. Such a vehicle would already be outfitted with a seven wire circuit with auxiliary power wire, auxiliary ground wire and brake signal wire though the brake signal wire would not be connected to a braking system controller unless installed in the towing vehicle. Thus, the electronic braking control system 10 of this invention is useful on vehicles already equipped with a towing package. Second source for charger 100 may also be a solar array mounted on the trailer (not shown). Additionally, grade and motion device 30 may be powered directly from the auxiliary power wire 114 by extending connecting wire 104 to circuit breaker 60 as shown with dashed line from connection 109 to terminal 102 and on to terminal 61 of circuit breaker 60. Where auxiliary power 114 becomes energy source 5, charger 100, battery 20, meter switch 130 and power meter 120 may be omitted from braking control system 10 without comprising the function thereof as long as the towed vehicle remains attached to the towing vehicle, however, these components may also be retained in braking control system 10 by inserting another diode 108 in connecting wire 64 from battery 20 through charger 100 and retaining the connection to power in terminal 102 with connecting wire 104 in a "Y" like fashion. In either case, operation of braking control system 10 would remain as described above.

As is readily observed in FIG. 1, charger 100 receives power at power in terminal 102 through connecting wire 106 connected at power connection 101 to running light circuit green wire 112 of seven wire circuit 110, is grounded at ground terminal 105 to system ground 11 and supplies charging power to battery 20 through connecting wire 107 connected to charging terminal 103 on charger 100 and positive battery terminal 21 on battery 20. As battery 20 is also connected to system ground 11 at negative terminal 22 a charging circuit is completed from running light circuit green wire 112. Battery 20, when used as energy source 5, may also be charged externally of electronic braking system 10 utilizing external positive terminal 23 and external negative terminal 24. Furthermore, external positive terminal 23 and external negative terminal 24 may be used to power electronic braking system 10 from another energy source 5 onboard the towed vehicle by connecting directly to the respective terminals of the energy source 5 onboard the towed vehicle, for instance, when battery 20 is dead or has been removed from electronic braking system 10. For instance, a boat battery may be directly connected to external positive and negative terminals 23, 24 respectively with jumper cables or alligator clips to provide for energy source 5. Other energy sources 5 onboard the towed vehicle such as portable AC or DC generators, rectifiers, auxiliary batteries or solar panels may advantageously be used by connecting through terminals 23, 24.

In electronic braking device 10, circuit breaker 60 is provided to protect grade and motion detection device 30 by interrupting current flow from energy source 5 in case of large electrical surges. Circuit breaker 60 is connected to energy source 5 through connecting wire 64, circuit breaker 60 receiving power directly from energy source 5 at first terminal 61 with device 30 connected to second terminal 62 through connecting wire 63 at power terminal 31. Circuit breaker 60 is preferably of the interruptible type such that instantaneous surges sometimes found in vehicles does not render electronic braking device 10 totally inoperable. Thus, when a momentary surge occurs, circuit breaker 60 trips but resets after a specified time, usually about five seconds. In the preferred embodiment in FIG. 2, circuit breaker 60 is generally included in the circuit board of controller 15 but may be added wherein a specific controller used as controller 15 does not contain a circuit breaker therewithin.

In the embodiments shown in figures, electric trailer braking system for a towed vehicle or trailer having at least one pair of wheels fitted with electrically actuated brakes comprises a self contained electronic braking control device 10 mounted upon the trailer, braking control device 10 comprising means 14 for sensing deceleration of the trailer and means 48 for actuating the electrically actuated brakes of the trailer upon receiving a signal from the braking system of the towing vehicle. Means 14 for sensing deceleration is an integral part of grade and motion device 30 and may comprise any of the above mentioned brake controllers and may additionally comprise a modified conventional brake controller having pendulum or hall effect sensors mounted in an orthogonal array wherein one pendulum or hall effect sensor is adapted to sense motion in the ±X direction while another pendulum or hall effect sensor senses motion in the ±Y direction. As each is now adapted to sense motion in a positive or negative direction the function thereof becomes equivalent to the piezoelectric sensor used in the G-force indicator. As such, the pendulum or hall effect sensor is also adapted to sense a change in grade in the ±Z direction. Means 48 for actuating the brakes of the towed vehicle comprises the output circuitry of controller 15 blue brake wire 117, safety breakaway switch 70 and energy source 5, these components connected to the brake system of the towed vehicle.

As shown in FIG. 1, grade and motion detection device 30 is connected to brake control system 10 wherein power is fed to power terminal 31 from an energy source 5, a signal is given to apply a braking signal through signal power terminal 32, a brake output is directed to the brakes through brake output terminal 33 and ground terminal 34 completes power, signal and braking circuits by grounding to system ground 11 through ground wire 115. A braking signal comprises an electrical impulse through the braking light circuit from the towing vehicle by sending power through both the right hand turn signal brown wire 111 and left hand turn signal red wire 113 however, when a turn signal is provided for either right or left hand turning, power flows only through one of these circuits. In this invention, braking signal power comes from the braking light circuit of the towing vehicle through relay 80 to detect when brakes are applied in series with timer 40 to differentiate between a braking signal and a momentary power signal such as is generated with a four-way emergency flasher system on most modern towing vehicles 54. Wire 83 connects blade 88 of relay 80 to right hand turn brown wire 111 at connection 81 which powers one side of a switch internal in relay 80 and thus supplies one half of the braking signal to device 30, however, as the internal switch must be activated by a signal through an electromagnetic coil also internal in relay 80, power must also flow through wire 84 from left hand turn red wire 113 connected to connection 82 to blade 86 on relay 80 when a signal is also sent through left hand turn red wire 113. Both right hand turn brown wire 111 and left hand turn red wire 113 must carry current in order to provide a braking signal Therefore, when a current is sent only through right hand turn signal brown wire 111, power is supplied to blade 88, however since current is only present in right hand signal brown wire 111, the internal coil in relay 80 is not activated, the internal switch remains in the open position and only a right hand signal is generated. As the internal coil in relay 80 has one end connected to ground terminal blade 85, when a left hand turn signal is sent through left hand turn red wire 113 a circuit is completed through the internal coil and the internal switch is moved to a closed position against blade 87 but as no current flows through right hand turn signal brown wire 111, a braking signal is not sent from blade 88 to blade 87 and therefore a left turn is only indicated. As can be appreciated by those skilled in the art, power to only one of blades 86, 88 flows when left hand turn signals or right hand turn signals are directed from the towing vehicle and hence no braking signal is generated as the internal switch between blade 88 and blade 87 remains in the open position or the coil remains inactive. It should also be appreciated by those skilled in the art that a braking signal would be generated when power flows through both left and right hand turn signal wires 113 and 111 respectively when either the brakes or the emergency flashers on the towing vehicle are activated. When current flows through both right hand and left hand turn signal wires 111, 113 respectively, the internal coil activates closing the internal switch and current flows from blade 88 to blade 87 on relay 80 through wire 89 to terminal 42 providing a braking signal to timer 40. Since a braking signal can be generated through use of the emergency flashers, timer 40 differentiates between the momentary pulsing of the emergency flashers and a steady braking signal by only allowing current of the electrical impulse to flow through timer 40 having a duration greater than a first period. It has been found by the teachings of this invention that an emergency flasher signal is less than about 0.75 second and hence would not activate detection device 30 as timer 40 would not allow current to flow until the first period of at least 0.75 second is exceeded and therefore a duration greater than this first period indicates that the towing vehicle brakes have been applied. Once timer 40 receives a steady signal of greater than the first period, timer 40 allows current to flow through signal power wire 36 connected to one terminal 41 of timer 40 to signal power terminal 32 on detection device 30 thereby initiating a braking signal within grade and motion device 30. Then, when the grade and motion device 30 senses a change in grade or motion, a braking signal is passed to the towed vehicle brakes through brake output terminal 33 connected to brake circuit blue wire 117 of seven wire circuit 110.

Although timer 40 is shown connected between relay 80 and detection device 30, timer 40 could be connected between left hand turn connection 82 and blade 86 or between right turn connection 81 and blade 88 or between blade 85 and system ground 11 and accomplish the purpose of providing a preset time interval to differentiate between a turning signal and a braking signal. Although a simple capacitor timer may be utilized, any suitable automatically resetting timing device having a delay of from about 0.5 to about 1.5 seconds will suffice. A delay of shorter duration may cause surging of the electric brakes on the towed vehicle as signal pulses generated by the emergency flashers are approximately 0.5 second in length and a delay of longer than 1.5 seconds may result in unsafe operation of a towing/the towed vehicle combination.

As shown in FIG. 1, braking control system 10 of this invention also has a power monitor meter 120 connected to a switch 130 for checking the condition of battery 20. Switch 130 is connected to positive terminal 21 of battery 20 with a connecting wire 133 attached to positive connection 131 on switch 130 and to system ground 11 through meter 120. Specifically, switch 130 has connecting wire 134 connected to meter connection 132 thereon and to switch connection 121 on power meter 120. Connection wire 123 then connects ground connection terminal 122 of power meter 120 to negative terminal 22 and system ground 11.

In the preferred embodiment of FIGS. 2 and 3, controller 15 is connected to brake control system 10 wherein power is fed to power terminal 31 from an energy source 5, a signal is given to apply a braking signal through signal power terminals 86 and 88, a brake output is directed to the brakes through brake output terminal 33 and ground terminal 34 completes power, signal and braking circuits by grounding to system ground 11 through ground wire 115. As with system 10 in FIG. 1, a braking signal comprises an electrical impulse through the braking light circuit from the towing vehicle by sending power through both the right hand turn signal brown wire 111 and left hand turn signal red wire 113 however, when a turn signal is provided for either right or left hand turning, power flows only through one of these circuits. In this preferred embodiment, relay 80 and timer 40 are resident within the microprocessor in controller 15 and differentiate between a braking signal and a momentary power signal such as is generated with a four-way emergency flasher system on most modern towing vehicles 54. Here wire 211 is spliced directly onto and thereby connects right hand turn brown wire 111 at right turn connection 81 to controller 15 through terminal 88 thus suppling one half of the braking signal. An internal connecting switch in the microprocessor in controller 15 must be activated by a signal also through wire 213 from left hand turn red wire 113 connected to left hand turn connection 86 on controller 15. As recited above, an electrical impulse must flow through each of the right hand turn light circuit 111 and the left hand turn light circuit 113 of the towing vehicle in order to provide a braking signal and thus, timer 40 within microprocessor in controller 15 differentiates between the momentary pulsing of the emergency flashers and a steady braking signal by only allowing current to flow through timer 40 when the electrical impulse having a duration greater than a first period of approximately 0.75 second is exceeded. Then, when the grade and motion device 30 within controller 15 senses a change in grade or motion, a braking signal is passed to the towed vehicle brakes through brake output terminal 33 connected by braking wire 215 to brake circuit blue wire 117.

Braking control system 10 of this invention provides a presetting condition to the electric brakes of the towed vehicle by passing an initial electrical signal equal to approximately 20% of energy source 5 directly through grade and motion device 30 from terminal 31 through brake output terminal 33 to the electric brakes through the aforementioned circuits when the brake pedal is first depressed to light the brake light circuit which draws the electromagnet of the brake actuating lever against the flat surface inside of the brake drum. Little braking action occurs at this presetting condition as the brake actuating lever has not begun to move the brake shoes into contact with the surface of the drum but merely moves the electromagnet into contact such that actuation of the brakes may occur more rapidly when grade and motion device 30 senses a change in motion or grade. For instance, when the brake pedal on the towing vehicle is depressed only slightly to light the brake lights but not slow the vehicles appreciably, the electromagnet remains in its preset position against the inside flat surface of the drum and then when the brake pedal on the towing vehicle is depressed further to slow the vehicle, grade and motion device 30 senses a change in motion and applies a greater voltage to brake output terminal 33. In another instance, when the brakes of the towing vehicle are fully applied at the outset of a braking action, grade and motion device 30 already senses a change in motion and therefore, after the preset delay of timer 40, braking power proportional to the sensed change in motion is immediately applied to the brakes on the towed vehicle. In yet another instance, when the towed vehicle is descending a grade, grade and motion device 30 already has sensed a change in grade and when the brakes from the towing vehicle are applied, braking power is applied to the towed vehicle electric brakes in much the same manner thereby applying a proportional braking voltage at brake output terminal 33. Of course, the amount of electric braking signal output by detection device 30 at brake output terminal 33 would depend upon the steepness of the grade and/or rate of change in motion.

An accurate 12 volt signal is preferred for the proper operation of electronic brake control system 10 of this invention. The accurate 12 volt signal may exist at the towing location, especially in older vehicles, or be provided by a converter box mounted in the rear of the towing vehicle or may come directly from the towing package on those vehicles so equipped. Since the accurate 12 volt signal may be established at the towing location on the towing vehicle, no interruption of the automatic onboard computers on modern towing vehicles occurs. Similarly, since the accurate 12 volt signal is not affected by inoperative light bulbs on the towing vehicle, operation of electronic brake control system 10 remains unaffected.

Figure 7:
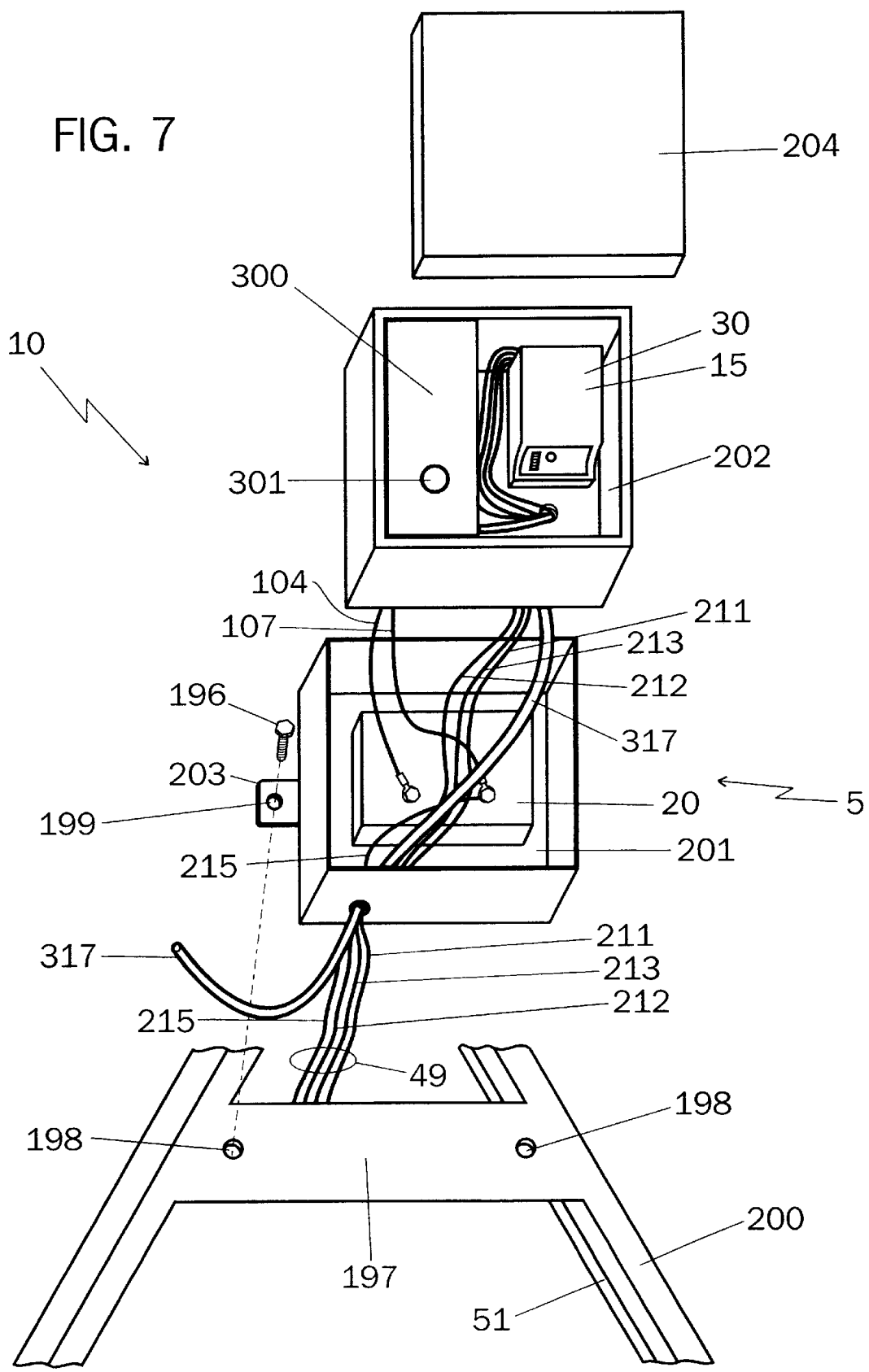
FIG. 7 is an exploded view of the preferred embodiment of the self contained electronic brake control device of this invention for an electric/hydraulic towed vehicle braking system shown above a mounting location on a towed vehicle.

Electronic brake control device 10 of this invention may also be used to control the hydraulic braking system on towed vehicles so equipped. Referring now to FIG. 7, compartment 201 effectively remains as is and contains an energy source 5 such as battery 20. Compartment 202 retains grade and motion device 30 therein wherein one of the brake controllers 15 described above is used to sense a change in motion in any direction, output a signal in response to a change in motion and energize and actuate the hydraulic brakes of the towed vehicle. Braking control system 10 still receives charging power through the running light circuit wire 113, braking signals through right and left hand turn signal wires 114 and 116 and is grounded through ground wire 115, the functions of the grade and motion device and the electrical connections described above remaining essentially the same. In the hydraulic braking control device of FIG. 7, the braking signal output from terminal 33 is passed to a pump motor of an integrated hydraulic component 300 wherein hydraulic component 300 provides hydraulic fluid to the hydraulic brakes of the towed vehicle through hydraulic brake line 317. Hydraulic component 300 provides an initial surge of fluid when an initial braking is sensed from the towing vehicle through braking light circuits 114, 116 to initially set the shoes of the hydraulic brakes in close proximity to the drum surface and thereafter provides a proportional output to the hydraulic brakes upon receiving an increased braking signal through output terminal 33 when grade and motion device 30 senses a change in motion. Braking control device 10 of FIG. 7 is also capable of correcting a swaying motion independent of a signal from the towing vehicle by sensing at least two successive lateral movements of the towed vehicle in the ±Y direction within a given time, generating a swaying signal upon sensing the lateral movements within controller 15, determining a rate of lateral movement of the towed vehicle, generating a braking signal within braking control device 10 wherein the braking signal is proportional to the rate of lateral movement, energizing the hydraulic brakes of the towed vehicle to initial engagement from hydraulic component 300 upon generating the swaying signal and applying hydraulic pressure from hydraulic component 300 to the hydraulic brakes of the towed vehicle proportional to the braking signal. Of course, other electric/hydraulic braking systems may use braking control device 10 by connecting terminal 33 of controller 15 to another electrically actuated component.

For enclosure 1, it is preferred that a powder coated steel or stainless steel metal box be constructed to arrange all the components in an easily accessible manner. For instance, battery compartment 201 separates the battery 20 from the electronic circuitry. Battery compartment 201 may be arranged alongside the electronic circuitry as shown in FIG. 1 but preferably is disposed below the electronic circuitry. A small battery 20, preferably of the dry cell, sealed type having sufficient ampere-hour rating to energize and sustain the electric brakes of the towed vehicle is installed into battery compartment 201 of upright enclosure 1 and secured therein. Conventional methods of securing a battery into a battery case may advantageously be used. One of the various grade and detection devices 30 as described herein is securely mounted along with charger 100 within compartment 202 of enclosure 1.

In FIG. 1, a five-pole relay 80 is also securely mounted to one of the interior walls of enclosure 1. Female connector 90 from a standard seven wire trailer connector set is affixed to one wall of enclosure 1 and male connector 50 from the set is affixed to another wall of the enclosure, each connector 50, 90 accessible from outside enclosure 1 such that connections to the standard male/female set on the towed vehicle and the towing vehicle may be connected to the electronic brake control system 10 without entering enclosure 1 The separable cover 204 may have a solar panel (not shown) affixed to the exterior top surface thereof with connecting wires passing through the cover to the interior of the enclosure 1. The connecting wires to the solar panel may be provided with a quick disconnect to enable the separable cover to be readily separated from the enclosure. A power meter 120 is preferably mounted through a wall of enclosure 1 with a switch 130 for periodically manually checking the condition of battery 20. In the FIG. 1 embodiment, enclosure 1 also has charger 100, circuit breaker 60 and timer 40 mounted internally thereof. Passing through a wall of enclosure 1 is breakaway safety switch 70, breakaway safety switch 70 adapted to receive a component 75 therein which when received, causes breakaway safety switch 70 to be a normally open switch. In FIG. 2, compartment 201 contains energy source 5 as described above and compartment 202 has charger 100 and controller 15 securely mounted therein. Connecting wires 211, 212, 213 and 117 pass from compartment 202 downwardly into and through compartment 201 with wires 105, 107 passing into compartment 201 from compartment 202, these wires connected to energy source 5. Ground wire 215 is shown connected to negative terminal 22 of batter 20, however it is fully understood that other means of providing a system ground may be employed without departing from the scope of this invention. Compartment 201 is typically provided with L-shaped brackets 203 having mounting holes 199 provided therethrough for mounting system 10 to tongue 200 of a trailer by passing a mounting screw 196 through each of holes 199 into holes 198 in crosspiece 197 of tongue 200. Wires 211, 212, 213 and 215 are then connected to the wiring loom 51 of the trailer with conventional T-shaped or bullet splice connectors readily available on the market. Wire 117 is connected to the lead in connection of each of the electric brake elements on the wheels of the trailer. Preferably, cover 204 slips over the outside walls of compartment 202 and is sealingly affixed thereto with screws through the side flanges of cover 204. Likewise, the periphery of the lower flange of compartment 202 is slightly larger than periphery of compartment 201 such that compartment 202 may be sealingly affixed to compartment 201 with screws through the lower side flanges thereof Where another onboard energy source is used for energy source 5, brackets 203 may be provided on compartment 202 wherein compartment 202 is secured to tongue 200. Enclosure 1 may be provided in a color to effectively match the color of the towed vehicle.

This invention provides for a method of controlling the braking of a towed vehicle using a self contained electronic braking control device 10 onboard the towed vehicle, braking control device 10 comprising an energy source 5, means 14 for sensing deceleration of the towed vehicle, means for generating a braking signal and means for energizing and actuating the brakes of the towed vehicle. The method comprises the steps of sensing deceleration of the towed vehicle, determining a rate of deceleration of the towed vehicle, sensing a braking signal from a towing vehicle towing the towed vehicle, generating a braking signal within braking control device 10 wherein the braking signal is proportional to the rate of deceleration, energizing and actuating the brakes of the towed vehicle to initial engagement from energy source 5 upon sensing the braking signal from the towing vehicle and applying energy from energy source 5 to the brakes of the towed vehicle proportional to the braking signal. In like manner, a method of controlling the swaying of a towed vehicle using a self contained electronic braking control device 10 onboard the towed vehicle is provided. Self contained braking control device 10 comprises an energy source 5, means 14 for sensing deceleration of the towed vehicle, means for generating a swaying signal, means for generating a braking signal and means 48 for energizing and actuating the brakes of the towed vehicle. The method comprises the steps of sensing at least two successive lateral movements of the towed vehicle in the ±Y direction within a given time, generating a swaying signal upon sensing the lateral movements, determining a rate of lateral movement of the towed vehicle, generating a braking signal within braking control device 10 wherein the braking signal is proportional to the rate of lateral movement, energizing the brakes of the towed vehicle to initial engagement from energy source 5 upon generating the swaying signal and applying energy from energy source 5 to the brakes of the towed vehicle proportional to the braking signal.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. In a hydraulic braking system of a trailer having at least one pair of wheels fitted with hydraulically actuated brakes, the improvement wherein said trailer braking system contains a self contained electronic braking control device mounted upon said trailer, said braking control device comprising a means for sensing deceleration of said trailer including a G-force indicator which senses a change in motion in any direction simultaneously along all orthogonal axes and output a signal proportional to the algebraic sum of said change in motion along said orthogonal axes, and means for actuating a motor of said hydraulically actuated brakes of said trailer independent of a signal from a vehicle towing said trailer.

2. A hydraulic trailer braking system as in claim 1 wherein said signal is an electrical signal, said electrical signal linear from a null point to a maximum.

3. A hydraulic trailer braking system as in claim 2 wherein said controller sends electric power to said motor on said trailer proportional to said electrical signal from said G-force indicator.

4. A hydraulic trailer braking system as in claim 1 wherein said signal is a digital signal, said digital signal linear from a null point to a maximum.

5. A hydraulic trailer braking system as in claim 4 wherein said brake controller converts said digital signal to an analog signal and sends electric power to said motor on said trailer proportional to said digital signal from said G-force indicator.

6. In a braking system comprising a towed vehicle having at least one pair of wheels fitted with hydraulically actuated brakes and a towing vehicle having electrical braking lighting circuitry, the improvement wherein said braking system comprises a self contained electronic braking control device mounted upon said towed vehicle, said braking control device comprising a means for sensing deceleration of said towed vehicle which simultaneously senses a change in velocity in ±X direction, ±Y direction and a change in grade perpendicular to a plane defined by said ±X, and ±Y directions, means for connecting said electric braking circuitry of said towing vehicle to a pump motor of an integrated hydraulic component connected to said hydraulically actuated brakes of said towed vehicle and means for actuating said hydraulically actuated brakes of said towed vehicle, said means for actuating comprising a braking signal established in said electrical braking lighting circuitry of said towing vehicle.

7. A braking system as in claim 6 wherein said braking signal comprises an electrical impulse through the right hand turn light circuit and the left hand turn light circuit of said braking lighting circuit of said towing vehicle.

8. A braking system as in claim 7 wherein said hydraulically actuated brakes of said towed vehicle are automatically energized to an initial engagement state upon sensing said braking signal from said towing vehicle.

9. A braking system as in claim 7 wherein said electrical impulse has a duration greater than a first pre-determined period, said first period comprising a time interval to differentiate between a momentary turning signal and a steady braking signal in said left hand turn light circuit and said right hand turn light circuit.

10. A braking system as in claim 9 wherein said first period is between 0.5 second and 1.5 seconds.

11. An electric trailer braking system as in claim 10 wherein said first period is greater than 0.75 second.

12. A braking system as in claim 6 wherein said means for sensing outputs an electrical signal to said integrated hydraulic component proportional to said change in velocity.

13. A braking system as in claim 12 wherein said integrated hydraulic component applies braking force to at least one of said at least one pair of wheels.

14. A braking system as in claim 9 wherein said initial engagement state comprises an initial surge of fluid to said hydraulically actuated brakes of said at least one said pair of said wheels from said integrated hydraulic component thereby setting the shoes of said hydraulic brakes in close proximity to the drum surface of said at least one said pair of said wheels.

* * * * *